Jan. 30, 1951  M. KATZ  2,539,841
SHOCK ABSORBER
Filed June 25, 1945
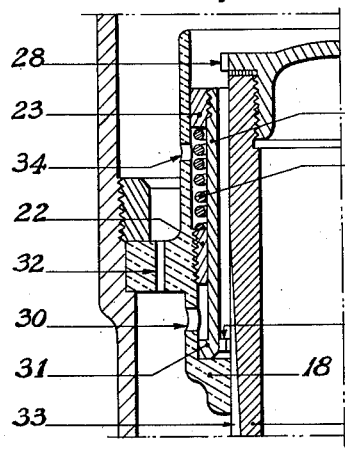
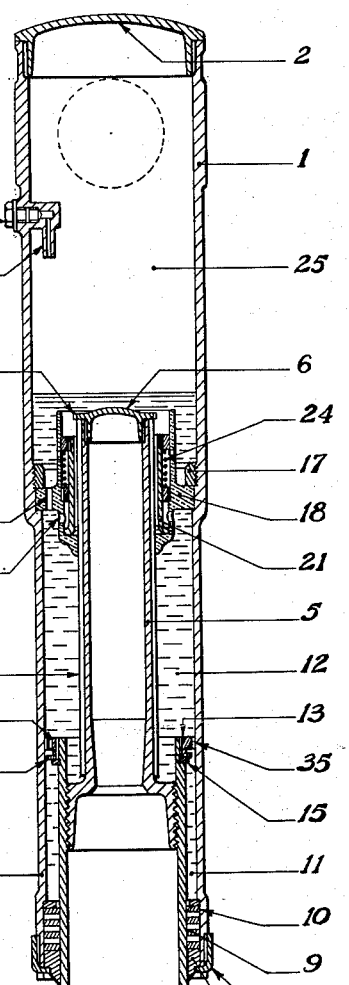
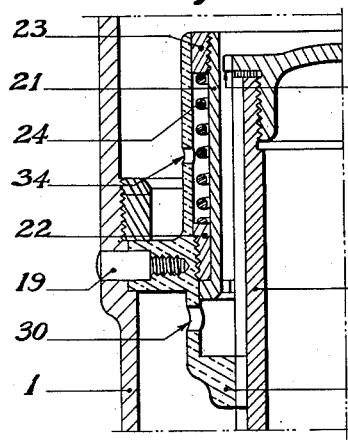
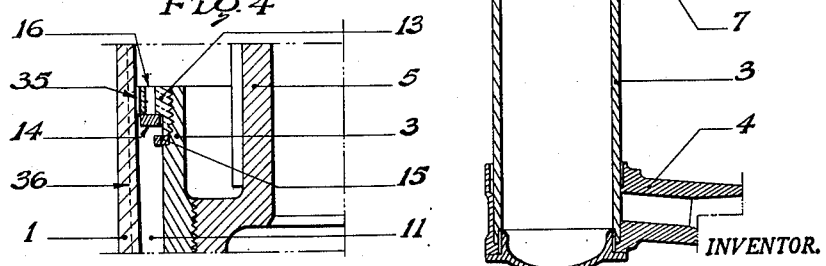
INVENTOR.
MAURICE KATZ
BY
Cameron, Kerkam, & Sutton
ATTORNEYS Patented Jan. 30, 1951

2,539,841

UNITED STATES PATENT OFFICE 2,539,841

SHOCK ABSORBER

Maurice Katz, Toulouse, France

Application June 25, 1945, Serial No. 601,483
In France April 14, 1942

10 Claims. (Cl. 267—64)

This invention relates to shock absorbers and has for its object to provide improvements in and relating to the same.

The shock absorber to which the present invention relates is intended, more particularly, for landing gears for aircraft. It differs principally from the similar shock absorbers which are used now by its great flexibility during taxying together with its high capacity for absorbing energy with a very high efficiency.

Thus, it brings a complete solution to the problem presented by the requirements for the landing and the rolling on the ground of aircraft, which requirements seemed hitherto to be contradictory It is known, indeed, that the running of aircraft on the ground, even when the ground is only slightly uneven, produces relative displacements of the sliding wheel-carrying leg or strut with respect to the fixed part of the shock absorber which occur at considerable speeds, often far higher than the vertical lowering speed of the aircraft for which the reaction of the shock absorber has been provided.

Since said reaction, or the sum of the stresses transmitted to the landing gear connections, increases very rapidly (almost with the square of the speed) it quickly exceeds the permissible limit, which itself is already too high in the case of high speed aircraft, and finally causes serious accidents (ground looping, breaking of gears, fastenings and the like).

The mastering and driving of the aircraft at the moment of take-off, as well as when landing, remain very difficult for the pilot owing to the high accelerations imparted to the aircraft body by the landing gear.

It is thus necessary to arrange taking-off and landing tracks which must be specially prepared for this purpose and the use of which constitutes a troublesome necessity.

All these inconveniences result, first of all, from the lack of flexibility in the shock absorber when running on the ground. Flexibility, i. e. the absence of considerable reaction, could be obtained hitherto, to a very small degree, only at the cost of efficiency and only for certain aircraft the vertical rate of descent of which scarcely does not materially exceed about 4 metres per second.

The shock absorber according to the present invention does away with, or at least reduces to a very large extent, all these inconveniences due to the provision of a device which eliminates, during the running, every reaction coming from the energy dissipating element and allows to exist only much smaller reaction coming from the elastic element. Thus, the total reaction is in every case smaller than the permissible value attained during the landing.

It comprises for this purposes: (1) an energy dissipating member formed of an annular chamber containing a special oil which does not freeze at the usual low temperatures, an expansion braking system and an oil throttling device working during the landing and for the time which is absolutely necessary for absorbing the shock, and (2) an elastic member comprising either a compressed air chamber, a metallic spring or a pile of rubber.

The whole shock absorber which forms the leg of an aircraft undercarriage is shown by way of example in Figure 1 of the appended single sheet of drawing, which figure is a longitudinal sectional view on a reduced scale showing the sliding tube carrying the wheel in partially driven-in position.

Figures 2, 3 and 4 are half-sectional partial views on a larger scale showing certain details of Figure 1.

Of course, this example of practical execution constitutes only a particular case of the application of the invention, and it will be understood that the construction and application of the shock absorber can be different than illustrated, the devices and methods which are used remaining the same.

According to the form of execution shown in the drawing the shock absorber comprises a tube 1 fastened on the aircraft and hermetically closed by a cap 2 in its upper part.

A movable tube 3 sliding in the tube 1 carries in its lower part a hub 4 intended for receiving the wheel (not shown in the drawing).

The tube 3 is extended in its upper part by a tube 5 which is fast and concentric with it, which has a smaller diameter and which is closed at the top by a plug 6.

A ring 7 maintained by a nut 8 on the lower part of the fixed strut 1 serves as a guide for the sliding tube 3.

A joint in the nature of a stuffing-box composed of a few packings of plastic material 9 and of a few wedges and metallic discs 10, insures the tightness of the bottom of the annular chambers 11 and 12 formed by the tubes 3 and 5 with the outer cylinder 1.

The tube 3 is provided at its upper extremity with an annular piston 13 which has sliding contact with the interior of the tube 1 and separates the chambers 11 and 12 filled with a special oil.

Communication between the chambers 11 and 12 is provided by vertical openings or ports 16 in the body of piston 13, and by grooves 35 in the periphery of the piston.

A movable ring 14, normally supported by a crown 15 in a position below and out of contact with the piston 13, covers the openings 16 of the piston 13 when the latter moves down.

In the middle part of the tube 1 a nut 17 locks in fixed position a diaphragm 18 of generally cup-shaped form serving as a guide for the sliding tube 5.

A plurality of gudgeon pins 19 can be provided around the periphery of the diaphragm to prevent its turning under the action of the twisting moment which it may be necessary to absorb in certain cases and which the tube 5 would transmit by means of its external splines 20.

Inside the diaphragm 18 is located a sliding ring 21 the upward movement of which is limited by a nut 22 screwed into the body of the diaphragm 18.

Another nut 23 fast with the ring 21 makes it possible, by means of the compression spring 24, to maintain the ring in its raised position, as shown in Figure 3.

The upper part of the tube 1 forms the compressed air chamber 25.

The filling with oil and then with air is effected thru the same nipple 26.

The small tube 27 fixes the oil level, the strut 3 being then at the bottom of its stroke.

The shock absorber works as follows:

When the aircraft is about to land, that is to say when the shock is about to be produced on the sliding tube 3, the latter is in its outermost or fully extended position and strikes thru the teeth 28 of the plug 6 onto the indented crown 29 which is formed in the lower part of and inside the ring 21. The latter rests, therefore, on the bottom of its recess provided in the body of the diaphragm 18 while compressing the spring 24 (Figure 2).

When the shock occurs, and during the whole time of the same the tube 3 is driven in and creates a powerful overpressure in the chamber 12 which communicates thru the large and numerous openings 30 in the lower portion of diaphragm 18 with the small annular space left between the ring 21, the nut 22 and the body of the diaphragm 18. This overpressure which acts thus on the upper face of the edge or shoulder 31 of the ring 21 maintains the latter in its initial position indicated in Figure 2 during the whole time of the raising movement of the strut 3, i. e. during the whole stroke of the shock absorber.

During this time the oil contained in the chamber 12 passes into the smaller chamber 11 thru the openings 16 which are then entirely uncovered by the ring 14.

The excess of oil which has to produce with the compressed air the reaction which is necessary for absorbing the energy of the shock is throttled part thru the small openings 32 in the flange of diaphragm 18 and part thru the grooves 33 in the outer surface of tube 5, into the chamber 25. The grooves 33 provided in the tube 5 have a suitable profile so as to offer to the oil, together with the openings 32, a section of passage which is such that the total reaction of the shock absorber which is due to the dissipator and to the adiabatic compression of the compressed air is constant during the whole stroke, in spite of variations in the speed of upward movement of the sliding strut 3. One thus obtains the maximum efficiency.

As soon as the shock is absorbed, an expansion occurs, and the movement of the strut 3 and of the oil changes its direction.

The pressure of the compressed air in the chamber 25 acts upon the top plug 6 of the tube 5 and causes the latter to go down.

A lowering of pressure is created in the chamber 12 and, accordingly, on the upper face of the edge 31 of the ring 21. The ring 21, which is submitted to a pressure which is uniform but not balanced on the upper side of the nut 23, the lower side of the same nut thru the openings 34 in the upper portion of the diaphragm 18 and on the lower face of the edge 31, raises and takes the position indicated in Figure 3. The raising of the ring 21, which could also be effected, but more slowly, by means of the spring 24 alone, is due more particularly to the partial vacuum existing in the chamber 12 and provoking the lack of balance between the forces acting upon the ring 21. The latter thus rises quickly and uncovers the large openings 30 which, while causing the chamber 12 to communicate freely with the chamber 25, do away with whatever reaction is caused by the throttling of the oil, which reaction is particularly high at high speeds.

Thus, after the absorption of the shock, the aircraft is taxying only on the compressed air, the pressure of which is rather small during the greatest part of the stroke which is independent of the speed, whence the great flexibility of the shock absorber.

It is evident that whatever movement of the sliding strut may ensue, the ring 21 keeps its position. It can be brought again onto the bottom of its recess in the diaphragm 18 only by engagement of the teeth 28 with the crown 29 after a complete expansion of the device, i. e. after the taking off of the aircraft; it would then be in a position ready for landing.

The position of Figure 3 is also the position of rest with the aircraft on the ground owing to the spring 24 which is intended to maintain the ring 21 in its raised position.

Since the aircraft rests with its weight on the undercarriage, the struts of the same are always driven in an appreciable part of their stroke. Thus, the taking off will also be effected on the compressed air alone, that is to say with a great flexibility, even on a bad ground.

In order to prevent rebounding of the aircraft due to sudden expansions, which are particularly dangerous at the end of the stroke when the pressure of the air which provokes them is maximum, the return of the strut is braked by means of the piston 13. For this purpose said piston (Figures 1 and 4) comprises a movable ring 14 which, under the action of the pressure produced in the chamber 11 during the downward movement of the piston 13, closes the openings 16 provided in said piston 13. Then the oil compressed in the chamber 11 can pass into the chamber 12 only thru the few grooves 35 of small section provided on the periphery of the piston 13.

Braking of the expansion can also be effected according to a more rational law thru grooves 36 having a variable section (shown in chainline in Figure 4) provided along the generating lines of the interior of the cylinder 1.

I claim:

1. A shock absorber particularly adaptable to use in the landing gear of aircraft comprising telescoping members and diaphragm means dividing the space enclosed by said members into communicating chambers one of which is of variable volume and filled with liquid and another which contains liquid and elastic cushioning means exerting a force on said liquid and tending to extend said members, said diaphragm means having a substantially unrestricted liquid passage therethrough and also a second liquid passage therethrough, a valve member movable to a position restricting the flow through said first passage, means on one of said telescoping members engageable with means on said valve member to move said valve member to flow restricting position when said telescoping members are fully extended, said valve member having surfaces which in the flow restricting position thereof are exposed to the pressures existing in said two chambers and the relative effective area of which is such that said valve member is maintained in flow restricting position by the greater pressure existing in said first mentioned chamber during compression of said telescoping members from their fully extended position, but is moved to non-restricting position when the pressure in said first mentioned chamber drops at the end of the compression movement whereby the resultant of the forces acting on said valve member changes in direction.

2. A shock absorber according to claim 1, said telescoping members forming a third chamber of variable volume that is full of liquid, orifice means connecting said third chamber with said first mentioned chamber, and valve means carried by one of said telescoping members for restricting flow through said orifice means during extending movement of said telescoping members.

3. A shock absorber according to claim 1, including resilient means acting on said valve member and tending to move it to said non-restricting position.

4. A shock absorber according to claim 1, said valve member closing said first passage when moved to said flow restricting position and being maintained in closed position during said compression by the liquid pressure in said first mentioned chamber acting through said first passage against one of said surfaces.

5. A shock absorber particularly adaptable to use in the landing gear of aircraft comprising telescoping members, diaphragm means in one of said members, the other member having a portion extending movably through said diaphragm means which form means to provide restricted liquid communication between the chambers on opposite sides of said diaphragm means, one of said chambers being of variable volume and filled with liquid and the other containing liquid and elastic cushioning means exerting a force on said liquid and tending to extend said members, said diaphragm means having a substantially unrestricted liquid passage therethrough, a normally open valve member for said passage, means on one of said telescoping members engageable with means on said valve member to move said valve member to closed position when said telescoping members are fully extended, said valve member having surfaces exposed to the liquid pressures in said chambers when the valve member is in closed position and the relative effective area of said surfaces being such that the resultant of the forces acting on said valve member during compression of said telescoping members from their fully extended position maintains said valve member in closed position, by virtue of the greater pressure in said chamber of variable volume during said compression, and such that said resultant is changed in direction when said greater pressure drops at the end of said compression and said valve member is moved to its normally open position.

6. A shock absorber according to claim 5, including resilient means acting on said valve member and tending to move it to open position.

7. A shock absorber according to claim 5, said telescoping members forming between their walls a third chamber of variable volume, piston means carried by one telescoping member and having sliding engagement with the other telescoping member for closing one end of said third chamber, said piston means having an orifice therein establishing communication between said third chamber and said first chamber of variable volume, and valve means carried by one of said telescoping members for closing said orifice during extending movement of said telescoping members.

8. A shock absorber particularly adaptable to use in the landing gear of aircraft comprising telescoping members, diaphragm means fixed in one of said members and having a tubular central section, the other telescoping member having a rod movable through said section, said diaphragm means dividing the space enclosed by said members into a chamber above said diaphragm means which contains liquid and air under pressure and a chamber below said diaphragm means which is filled with liquid, the lower portion of said tubular section having a flange directed inwardly toward and cooperating with said rod to form means providing restricted liquid flow between said chambers and said tubular section also having a port above said flange for substantially unrestricted liquid flow between said chambers, a sleeve member movable between said tubular section and said rod and between an upper position in which said port is open and a lower position in which said port is closed, means carried by said rod and engageable with said sleeve member for moving it downwardly to port closing position when said telescoping members move to their fully extended position, said sleeve member having surfaces which in its lower port closing position are subjected to the pressure in said upper chamber and to the pressure in said lower chamber acting through said port, the relative effective areas of said surfaces being such that the resultant of the forces acting on said sleeve member maintains it in port closing position as said telescoping members move from their fully extended position under compression, by virtue of the greater pressure existing in said lower chamber, and such that said resultant is changed in direction when said greater pressure drops at the end of the compression stroke and said sleeve member is moved to its upper position.

9. A shock absorber according to claim 8, including a spring urging said sleeve member toward its upper position.

10. A shock absorber according to claim 8, said telescoping members forming a third chamber of variable volume between their telescoping walls, closure means carried by one of said telescoping members and having sliding engagement with the other telescoping member for closing the end of said third chamber, said closure means having passages therethrough establishing communication between said third chamber and said lower chamber, and valve means carried by one of said telescoping members for closing said passages during extending movement of said telescoping members.

MAURICE KATZ.

REFERENCES CITED

The following references are of record in the file of this patent:

UNITED STATES PATENTS

| Number | Name | Date |
|---|---|---|
| 1,759,674 | Wallace | May 20, 1930 |
| 1,767,105 | Wallace | June 24, 1930 |
| 1,886,712 | Messier | Nov. 8, 1932 |
| 2,069,791 | Wallace | Feb. 9, 1937 |
| 2,098,398 | Mercier | Nov. 9, 1937 |
| 2,156,117 | Johnson | Apr. 25, 1939 |
| 2,224,306 | Krueger | Dec. 10, 1940 |
| 2,357,505 | Crispell | Sept. 5, 1944 |

FOREIGN PATENTS

| Number | Country | Date |
|---|---|---|
| 762,706 | France | Jan. 29, 1934 |